United States Patent [19]

Bertram

[11] Patent Number: 5,125,950

[45] Date of Patent: Jun. 30, 1992

[54] SOIL CONDITIONER

[75] Inventor: Kurt Bertram, Alfeld/Leine, Fed. Rep. of Germany

[73] Assignee: Gesellschaft fur Gnotobiotechnik und Bioforschung mbH, Gehrden, Fed. Rep. of Germany

[21] Appl. No.: 457,404

[22] Filed: Oct. 20, 1989

[30] Foreign Application Priority Data

Dec. 30, 1987 [DE] Fed. Rep. of Germany ....... 3744569

[52] U.S. Cl. .........................................................
[58] Field of Search ................... 71/1, 11, 27, 28, 903

[56] References Cited

U.S. PATENT DOCUMENTS 2,703,276  3/1955  Hedrick et al. ..................... 71/28 X
4,033,745  7/1977  Moore ..................................... 71/28

FOREIGN PATENT DOCUMENTS 51-22576  2/1976  Japan ........................................ 71/6

Primary Examiner—Ferris Lander
Attorney, Agent, or Firm—Darby & Darby

[57] ABSTRACT

A soil conditioner is described, which contains an electrolyte that is compatible with the soil and an invert sugar in a ratio of about 20:1 to 1:10. This material is active not only in the normal agricultural area, but also in the forestry area as a highly efficient soil conditioner. The soil is consequently regenerated, so that the plants assimilate better and noticeable increases in yield are achieved in the agricultural area.

6 Claims, No Drawings

SOIL CONDITIONER

TECHNICAL FIELD

The invention relates to a soil conditioner containing a sugar, as well as the use of this conditioner to increase soil ionization and the yield of cultivated plants.

STATE OF THE ART

The German Offenlegungsschrift 2,500,004 relates to a method for the preparation of a soil conditioner, which contains organic materials. In the moist state, the organic materials are intended to provide a colloid form, which is suitable for enclosing energy-storing compounds, with which a gradually setting-in interaction with the living soil is initiated and the utilization of biologically activating processes thereby is improved. One of the organic materials given is cane sugar. Moreover, it is said to be advisable to add phosphoric acid.

The German Patent 2,537,617 is concerned with a method for the preparation of a soil conditioner by mixing technical phosphoric acid with urea, saccharide being added as a further component. This conditioner is applied on the soil as an aqueous mixture.

There are no concrete numbers, which confirm the effectiveness of the soil conditioners described above. The invention described in the following shows that the desirable improvement in soil quality and the increase in the yield of cultivated plants is not achieved only by the use of can sugar. Rather, surprising advantages can be achieved by selecting a special saccharide.

DISCLOSURE OF THE INVENTION

It is therefor an object of the invention to develop known soil conditioners further, so that they shown an improved soil efficiency in the soil, which can also be confirmed by a noticeable increase in the yield of cultivated plants.

Pursuant to the invention, this objective is accomplished owing to the fact that the soil conditioner contains an electrolyte, which is compatible with the soil, and an invert sugar in a ratio of about 20:1 to 1:10.

The essence of the inventive soil conditioner lies in the combination of an invert sugar and electrolyte, which is compatible with the soil, in a particular ratio by weight. Within the meaning of the invention, "invert sugar" refers to the mixture of glucose and fructose, which is formed with inversion of the optical rotation when cane or beet sugar (sucrose) is subjected to the action of acids and/or invertase, and which confers sweetness, for example, on honey and artificial honey. Within the scope of the invention, it is preferred if the invert sugar has a degree of inversion of about 55 to 75%, preferably of 60 to 70% and especially of about 66%.

Aside from the invert sugar of the type described above, the inventive soil conditioner must contain an electrolyte, which provides for a special ionization of the treated soil. This electrolyte is composed preferably of an alkali metal of an organic acid compatible with the soil, such as formic acid, acetic acid and propionic acid. Within the scope of the invention, sodium acetate is preferred.

Further additives, which exert additional effects on the soil, such as the additives, which are contained in the above-mentioned soil conditioners of the state of the art, may be incorporated into the inventive soil conditioners.

The essential components of the inventive soil conditioner that have been mentioned (electrolyte/invert sugar) should be contained in this soil conditioner in a ratio by weight of about 20:1 to 1:10 and especially of about 10:1. In the practical application, they are preferably applied in an aqueous solution with a concentration of about 1 to 0.01% by weight and especially of about 0.1% weight on the soil that is to be treated. An advantageous, inventive soil conditioner is obtained, for example, if about 10 parts by weight of a 25% by weight aqueous solution of acetic acid, about 70 parts by weight of an about 50% by weight sodium hydroxide solution and about 30 parts by weight of invert sugar are mixed together, preferably with cooling, and this solution is then diluted with water to the percentage by weight range mentioned above.

The inventive soil conditioner brings about an advantageous vegetation phase and, by increasing the ionization of the coil, an improvement int he assimilation by the cultivated plants, the invert sugar portion being absorbed by the plants in an advantageous manner and the assimilation being increased thereby. Koening, of the Kernforschungszentrum in Karlsruhe, for example, deals with importance of the ionization of the soil in "Umschau" 1986, No. 2, pages 109/110. Presumably, the soil microorganisms or microfungi, which contributed to an improved vegetation of the cultivated soils, are activated by the use of aqueous soil conditioners. Field experiments showed that the crop yields of special cultivated plants were increased by up to about 30 to 40% by increasing the ionization or soil electricity. At the same time, it was possible to reduce the seeding by 45%. In the case of Doppelnull-Raps (double zero rape), it was possible to reduce the toxic materials of glucosinolates in the rape fruit to a minimum of about 7.9 micromoles. while the normal values are at about 20 to 25 micromoles.

The inventive soil conditioner not only increases yields, but, on the whole, makes a contribution to protecting the environment by saving fertilizer (preserving underground water/preventing the breakdown of ozone), reactivating the soil, preventing the death of game that is caused by the cultivate plant "Doppelnull-Raps" (double zero rape) and decontamination (radioactivity). It therefore restores the ability of the soil to regenerate and acts in the soil as electrolyte and activates sick and weak soils. Moreover, it neutralizes acids in all types of soils, especially in arid sand soils, and serves to eliminate sulfuric acid ($SO_2$) and nitrogen oxides. By improving the biological synthesis of ammonia, it creates the possibility for the absorption of nutrients by microorganisms and maar roots to improve the soil biotop. By forming auxins, it furthermore creates an advantageous gas constant in the tree and root region and, in addition, affects the whole of the vegetation positively. It has a high efficiency and produces extreme growth. It increases crop yields and improves the quality; it reduces the addition of fertilizer, decreases the toxins in the soil, in lakes and rivers and, moreover, protects and improves the environment. In diluted form, it is harmless to insects and microorganisms. It should, however, be remembered that it ought not come into contact with mucous membranes or the eyes of the persons using it.

In effect, the object of the invention is therefore accomplished to a surprisingly advantageous extent. In experiments extending over many years, it was possible to develop a soil activating agent, which also prevents forests dying off and contributes to the recovery of diseased forest stands. Numerous experiments outside of the laboratory area in Niedersachsen and Nordrhein-Westfalen confirm that it visibly and measurably permits the recovery of already diseased soil.

The invention is described in greater detail by means of an example, which is directed to a field experiment with Doppelnull-Raps (double zero rape).

EXAMPLE (FIELD EXPERIMENT)

In 1986, an experiment with 00 rape was carried out as follows in secrecy. Two experimental field of average quality were selected. The two fields were about 4 hectare in size and lay next to one another. After the germination of the embryos, 1.6 Kg of the soil conditioner (20 parts by weight of invert sugar (66% degree of inversion), mixed with 70 parts by weight of 50% aqueous sodium hydroxide solution and 10 parts by weight of 25% aqueous acetic acid) with 1.600L of water were sprayed with a mobile pressure spray on Sep. 13, 1986, on the sowing of the one field (400L/hectare). On Mar. 20, 1987, it was observed that the plants had survived the winter well and had suffered no damage due to frost or pollutants. On Jul. 7, 1987, extreme growth was observed for the plants on the treated field. The height was more than 2 m and the thickness of the stems was more than 2 cm.

The following results were observed on comparing the results:

|  | With Soil Conditioner* | Without Soil Conditioner* |
|---|---|---|
| Crop (Lidora) |  |  |
| Plant Height | 200 cm | 120 cm |
| Stem Thickness | 2 cm | 1.5 cm |
| Pod Length | 10 cm | 6 cm |
| Number of Grains | 35 | 19 |
| Crop Yield | 40 dz/hectare | 27.5 dz/hectare |

*Additional lime/ammonia/potassium nitrate was added as fertilizer

What is claimed is:

1. A soil conditioner comprising a mixture of a soil compatible electrolyte and an invert sugar having a degree of inversion of about 55% to about 75% in a ratio, by weight, of 20:1 to 1:10.

2. The soil conditioner according to claim 1, wherein said electrolyte is sodium acetate.

3. The soil conditioner according to claim 1, wherein said invert sugar comprises inverted cane sugar having a degree of inversion of about 60% to about 70%.

4. The soil conditioner according to claim 1, wherein said mixture is present in an aqueous solution in a concentration of about 0.1 to about 1.0% by weight of said solution.

5. The soil conditioner according to claim 1, wherein said mixture is present in an aqueous solution in a concentration of about 0.1% by weight of said solution.

6. A method of using a soil conditioner prepared in accordance with claim 1, said method comprising exposing a soil to an effective amount of said soil conditioner to increase soil ionization and cultivated plant yields.

* * * * *